United States Patent [19]
Huitema et al.

[11] Patent Number: 5,012,144
[45] Date of Patent: Apr. 30, 1991

[54] LINEAR DIRECT DRIVE MOTOR

[75] Inventors: Thomas W. Huitema, Galesburg; William H. Eiszner, Jr., Portage; Stanley D. Heeres; Robert D. Vanderlaan, both of Kalamazoo, all of Mich.

[73] Assignee: Pneumo Abex Corporation, Boston, Mass.

[21] Appl. No.: 371,936

[22] Filed: Jun. 27, 1989

[51] Int. Cl.[5] .............................................. H02K 41/00
[52] U.S. Cl. ...................................... 310/14; 335/230; 310/23
[58] Field of Search ....................... 310/14, 15, 17, 23, 310/34, 90; 335/234, 249, 251, 255, 258, 262, 270, 271, 272, 277

[56] References Cited

U.S. PATENT DOCUMENTS

| | | | |
|---|---|---|---|
| 4,507,634 | 3/1985 | Vanderlaan | 335/272 |
| 4,533,890 | 8/1985 | Patel | 335/229 |
| 4,533,891 | 8/1985 | Vandelaan et al. | 335/272 |
| 4,859,975 | 8/1989 | Uetsuhara | 335/234 |
| 4,928,028 | 5/1990 | Leibovich | 310/23 |
| 4,945,269 | 7/1990 | Kamm | 310/15 |

*Primary Examiner*—Steven L. Stephan
*Assistant Examiner*—Judson H. Jones
*Attorney, Agent, or Firm*—Renner, Otto, Boisselle & Sklar

[57] ABSTRACT

Linear direct drive motor includes a pair of axially spaced, relatively fixed stator poles and an armature mounted on a motor shaft for axial movement between the stator poles. The ends of the motor shaft are supported by centering springs which permit axial movement of the shaft and thus the armature relative to the stator poles. Positive stops are located between the stator and stator poles for preventing armature overtravel. Extending between the stator poles is a sleeve member which supports a ring magnet in radially spaced relation from the armature. Adjacent opposite ends of thee ring magnet are a plurality of layers of electrical coils, with the layers adjacent one end of the magnet being paired with different layers at the other end to provide redundant electrical channels and symmetric motion behavior.

50 Claims, 2 Drawing Sheets

LINEAR DIRECT DRIVE MOTOR

BACKGROUND OF THE INVENTION

This invention relates generally, as indicated, to a linear direct drive motor which is especially intended for use in directly driving proportional flow control valves for aircraft flight control servo actuation systems or other such proportional devices.

New and advanced military aircraft flight control servo actuation systems require direct drive proportional flow control valves with enhanced capabilities for execution of dynamic load damping, actuator stiffness enhancement and flutter suppression. This has created a need for an improved force motor design for operating such valves which has the necessary frequency response characteristics, output power, linearity and symmetry to support such valve requirements.

SUMMARY OF THE INVENTION

With the foregoing in mind, it is a principal object of this invention to provide an improved force motor design for reliably converting variable input currents into proportional force and displacement outputs for use in directly driving a proportional servo valve or other such proportional device.

Another object is to provide such a force motor that is sufficiently compact in size and light in weight to meet the weight and envelope restrictions of advanced aircraft and aerospace applications and the like.

Still another object is to provide such a force motor with stable operating characteristics over a broad range of operating pressures and temperatures.

Yet another object is to provide such a force motor which lends itself to production fabrication and assembly techniques.

Another object is to provide such a force motor which lends itself to multiple independent electrical input signals for system redundancy.

Still another object is to provide such a force motor with a unique support system which eliminates any sliding contact bearings for the motor armature which could jam or introduce friction.

Still another object is to provide such a force motor with a support system for the motor armature including motor centering springs that provide the desired stiffness in the lateral plane to prevent the armature from rubbing against the side walls and causing friction.

Yet another object is to provide such a force motor with support system for the motor armature including motor centering springs that provide the desired stiffness for the armature in the lateral plane in a relatively small package size without inducing armature side loads while providing a high spring rate and maintaining a high ratio of energy storage to package size.

Another object is to provide such a force motor in which the motor centering springs insure in-line motion of the armature without angularity and redundancy against fracture without added package bulk or complexity.

Yet another object is to provide such a force motor including an inner motor assembly which is spring biased to the mounting end of the motor to minimize null shifts due to changes in pressure or temperature and maintain uniform edge clamping of the motor centering springs.

A further object is to provide such a force motor which has a relatively high natural frequency, i.e., greater than 150 Hz, by virtue of its relatively small moving mass and high spring rate.

Another object is to provide such a force motor with a controlled amount of damping to provide resistance to resonating due to outside excitation.

Still another object is to provide such a force motor in which overtravel of the motor armature is prevented.

Still another object is to provide such a force motor with layered/paired motor coils to make more efficient use of available space and permit the coils to be more easily produced than the conventional adjacent coil construction.

Another object is to provide such a force motor with controlled pressure loading of the inner motor components to minimize component loading and null shift due to changes in pressure.

Still another object is to provide such a force motor which remains intact when disconnected from a proportional servo valve or other such proportional device.

To the accomplishment of the foregoing and related ends, the invention, then, comprises the features hereinafter fully described and particularly pointed out in the claims, the following description and the annexed drawings setting forth in detail a certain preferred embodiment of the invention, this being indicative, however, of but one of the various ways in which the principles of the invention may be employed.

DETAILED DESCRIPTION OF THE PREFERRED EMBODIMENT

Figure 1:
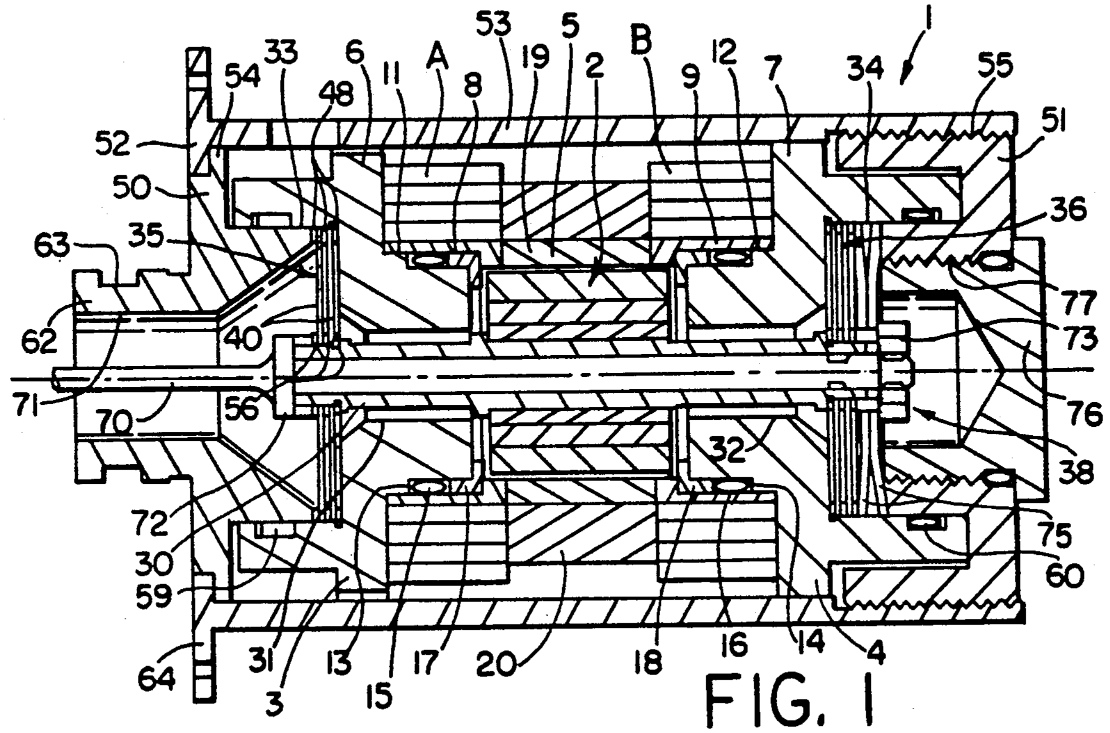
FIG. 1 is a longitudinal sectional view through a preferred form of linear direct drive motor in accordance with this invention.

Referring now in detail to the drawings, and initially to FIG. 1, there is shown a preferred form of force motor 1 in accordance with this invention which, as described hereafter, reliably converts variable electrical input currents into proportional force and displacement outputs, thus making it ideal for use in directly driving a proportional servo valve or other such proportional device, not shown. Force motor 1 is of the linear type including an axial motion armature 2 axially movable between a pair of axially spaced, relatively fixed stator poles 3, 4.

To maintain the required spacing between the stator poles 3, 4, a sealing sleeve 5 or the like is interposed between radial flanges 6, 7 on the armature poles. The outboard portions 8, 9 of sealing sleeve 5 may extend coaxially over reduced diameter cylindrical inner end portions 11, 12 of the stator poles 3, 4, which may have steps 13, 14 intermediate their ends to provide clearance spaces between such outboard portions 8, 9 and cylindrical inner end portions 11, 12 for receipt of static seals 15, 16 and armature stops 17, 18 therebetween, for a purpose to be subsequently described.

Figure 3:
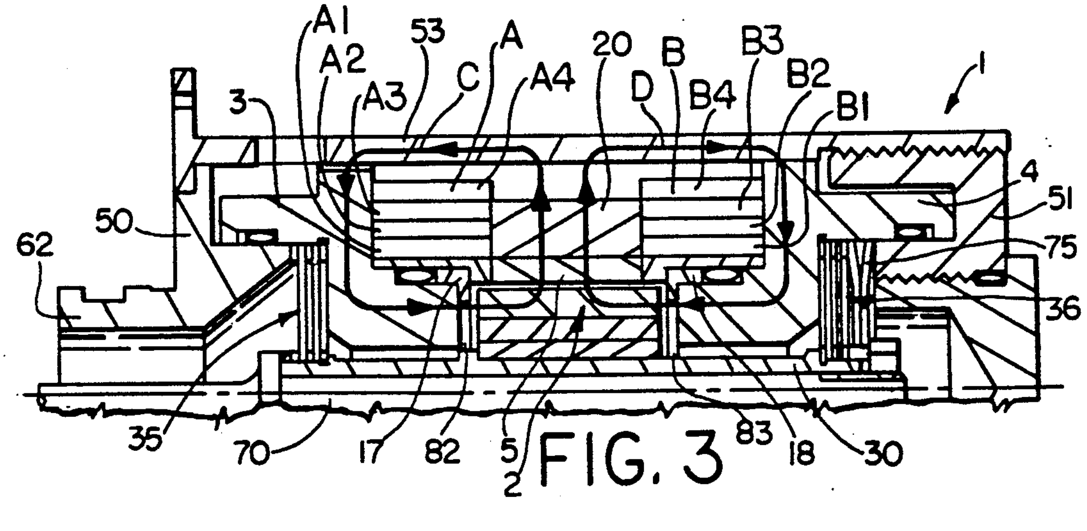
FIG. 3 is a fragmentary longitudinal section through the motor of FIG. 1 with the motor armature shown in the null, centered position and the flux paths balanced which is the case when no electrical current is applied to the motor coils.

Surrounding the central portion 19 of sealing sleeve 5 is a ring magnet 20 that is radially polarized. At opposite ends of magnet 20 are one or more armature coils A, B. Preferably both such coils A, B are layered and paired appropriately to provide redundant electrical channels and to insure that each channel provides symmetric motion behavior. FIG. 3 schematically shows two such coils A and B each including four layers sequentially numbered Al through A4 and B1 through B4, respectively, from the innermost layer to the outermost layer. In such a construction, the coil layers are desirably interconnected as follows: the innermost layer A1 of coil A is connected to the outermost layer B4 of coil B; the second innermost layer A2 of coil A is connected to the third innermost layer B3 of coil B; the third innermost layer A3 of coil A is connected to the second innermost layer B2 of coil B; and the outermost layer A4 of coil A is connected to the innermost layer B1 of coil B. This configuration makes more efficient use of available space and is more easily produced than conventional adjacent coils. While four layers are shown in each coil A, B, it should be understood that through proper coil and layer sizing, symmetric operation could also be obtained with coils A, B having a greater or lesser number of layers, including one, two or three layers.

Figure 2:
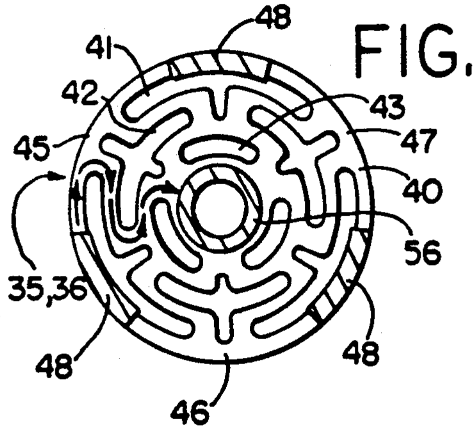
FIG. 2 is an enlarged transverse section through one of the motor shaft centering springs for the motor of FIG. 1.

Armature 2 is shown mounted on motor shaft 30 intermediate the ends thereof. The ends of motor shaft 30 extend through larger diameter coaxial openings 31, 32 in the respective stator poles 3, 4 and into counterbores 33, 34 in the outer ends thereof containing centering springs 35, 36 for supporting the inner motor assembly 38 including the motor shaft 30 and armature 2. In the preferred form of the invention disclosed herein, each centering spring 35, 36 consists of a plurality of flat disk-like elements 40 each having a plurality of circumferentially and radially spaced slots 41–43 cut therein in a complex symmetrical pattern as schematically shown in FIG. 2 to create a series of flat plate beam sections 45–47. Such a spring design produces a relatively high but controlled spring rate in the axial plane while maintaining an extremely high lateral stiffness, thus eliminating the need for sliding contact bearings for the motor shaft 30 which could jam or introduce friction. Spring disks 40 may be spaced apart as by means of spacers and/or plated pads 48 circumferentially spaced around the outer periphery of the spring disks (see FIGS. 2 and 3) to prevent rubbing contact therebetween.

The spring disks 40 contact each other only at the built-up areas 48 which exist in two or more symmetrical regions, thereby providing additional flexure length at the periphery between the built-up areas 48 resulting in a smaller, more efficient flexure. Furthermore, the multiplicity of the mode (flexure) paths per spring disk 40 and the use of multiple spring disks 40 insure in-line motion of the motor shaft 30 and armature 2 supported thereby without angularity and with redundancy against fracture without added package bulk or complexity. Of course, the number and/or thickness of the spring disks 40 may be varied to vary the spring rate while maintaining a high ratio of energy storage to package size to provide a force motor design having the desired high natural frequency (e.g., greater than 150 Hz) by virtue of the relatively small moving mass of the motor and high spring rate.

When two or more such spring disks 40 are stacked together with the built-up areas 48 at the outer periphery of the spring disks 40 aligned and contacting as shown in FIG. 1, such built-up areas 48 may be clamped to the respective stator poles 3, 4 as by respective end members 50, 51 at opposite ends of the motor 1 which extend into the respective counterbores 33, 34. The end member 50 at the left end of the motor 1 (as seen in FIGS. 1 and 3) may be retained within the counterbore 33 as by providing an inturned flange 52 at the left end of an external motor housing 53 surrounding the motor 1 which overlaps an outturned flange 54 on the end member 50, whereas the other end member 51 at the right end of the motor may be retained in place as by providing a threaded connection 55 between such other end member 51 and housing 53. Centrally of the spring disks 40 are annular built-up hub areas 56 which also maintain the inner periphery of the spring disks 40 in the desired spaced relation on the motor shaft 30.

Additional static seals 59, 60 may be provided between overlapping cylindrical surfaces of the respective counterbores 33, 34 in the stator poles 3, 4 and end members 50, 51. Preferably these static seals 59, 60 have a diameter somewhat greater than the diameter of the static seals 15, 16 between the reduced inner end portions 11, 12 of the stator poles 3, 4 and sealing sleeve 5. When the motor 1 is clamped to a valve housing with the protruding end portion 62 of the left end member 50 extending into a cavity in the valve housing (not shown), the interior of the motor 1 will be exposed to the fluid pressures within the valve housing. By making the pressure areas of the seals 15, 16 in the armature region of the inner motor assembly 38 slightly less than at the outer end seals 59, 60, a small compressive load will be maintained on the armature poles 3, 4 while minimizing component loading and null shift due to changes in pressure.

The protruding end 62 of the left end member 50 may have an external annular groove 63 therein for receipt of a static seal (not shown). Also, suitable mounting flanges 64 may be provided on the left end of the motor housing 52 to facilitate clamping of the motor housing to a valve housing.

To drive a valve, the motor shaft 30 is desirably hollow for receipt of a valve quill 70 which extends outwardly through a central opening 71 in the left end member 50. Valve quill 70 may be secured to the motor shaft 30 as by providing a shoulder 72 on the valve quill which abuts the left end of the motor shaft 30 and a suitable fastener 73 on the right end of the valve quill 70 which abuts the right end of the motor shaft 30. This connection between the valve quill 70 and motor shaft 30 may also be used to retain the centering springs 35, 36 on the motor shaft 30, whereby the motor 1 will remain intact when disconnected from the valve.

Also, Belleville loading springs 75 may be provided at the right end of the motor shaft 30 between the centering spring 36 and right end member 51 for spring biasing the inner motor assembly 38 to the mounting end of the motor as further illustrated in FIG. 1. Such Belleville springs 75 will accommodate small dimensional changes without noticeable changes in clamp load, whereby null shifts due to changes in pressure or temperature are minimized. In addition, such Belleville springs 75 have the further advantage of maintaining uniform edge clamping of the centering springs 35, 36.

After the centering springs 35, 36 and Belleville springs 75 have been assembled on the motor shaft 30 and the drive quill 70 has been secured in place, an end closure 76 may be threaded into the access opening 77 in the end member 51 to complete the assembly.

With such a motor construction, when no electrical current is applied to the motor coils A, B, the armature 2 is conditionally stable and the flux paths C, D are balanced as schematically shown in FIG. 3. This condition results because of the centering springs 35, 36 at each end of the armature 2 which provide a total positive rate that produces stable restoring forces exceeding the unstable magnetic forces and also provide the stiff side (radial) restraint desired for maintaining the armature 2 in the null or centered position shown in FIGS. 1 and 3.

Figure 4:
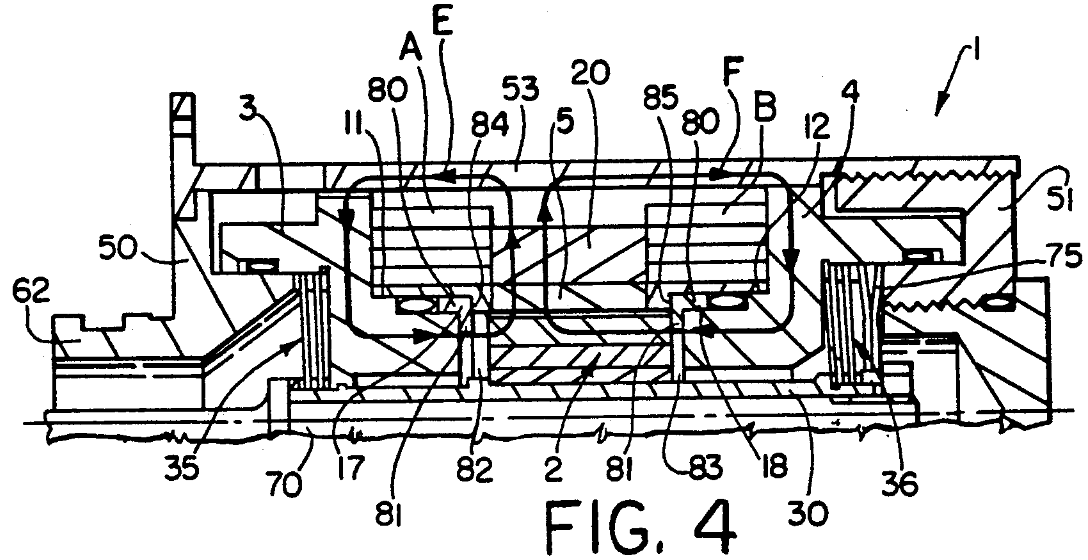
FIG. 4 is a fragmentary longitudinal section through the motor of FIG. 1 which is similar to FIG. 3 but the armature is shown shifted to the right which results when a positive current is applied to the motor coils, thus causing a greater flux flow through the right stator pole than through the left stator pole.

When a positive direct or pulse width modulated current is applied to the motor coils A, B, the electric and magnetic fields flux will combine to produce a greater flux flow through one pole, for example the right pole 4, thus causing the inner motor assembly 38 including the armature 2, motor shaft 30 and valve quill 70 to be shifted to the right as schematically shown in FIG. 4. Conversely, when a negative current is applied to the motor coils A, B, the electric and magnetic fields flux will combine to produce a greater flux flow through the left pole 3 than through the right pole 4, thus causing the inner motor assembly 38 to be shifted to the left as schematically shown in FIG. 6.

Figure 5:
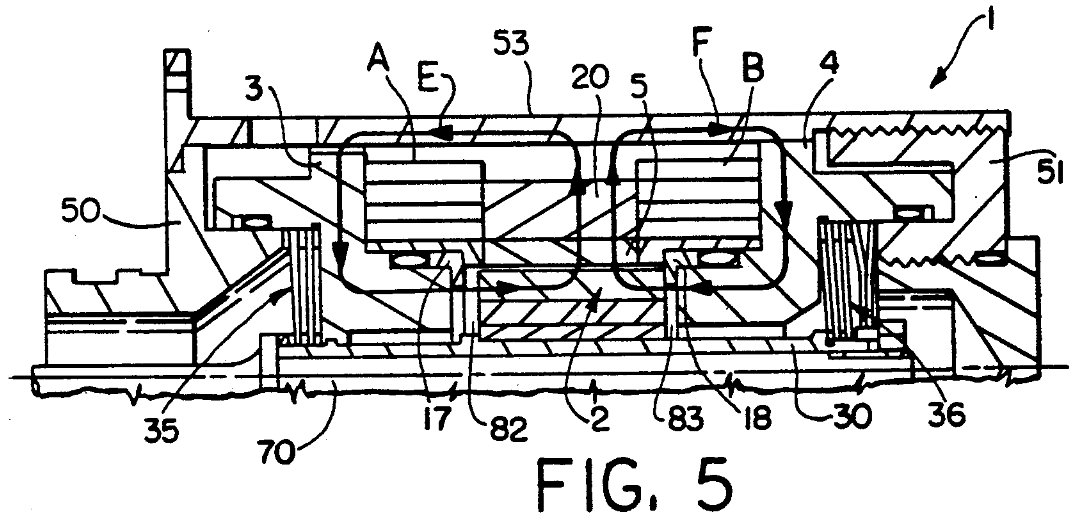
FIG. 5 is a fragmentary longitudinal section through the motor of FIG. 1, showing the armature shifted to the right similar to FIG. 4 but also showing the coil current reversed to assist the mechanical springs in providing a maximum return force for chip shearing.
Figure 6:
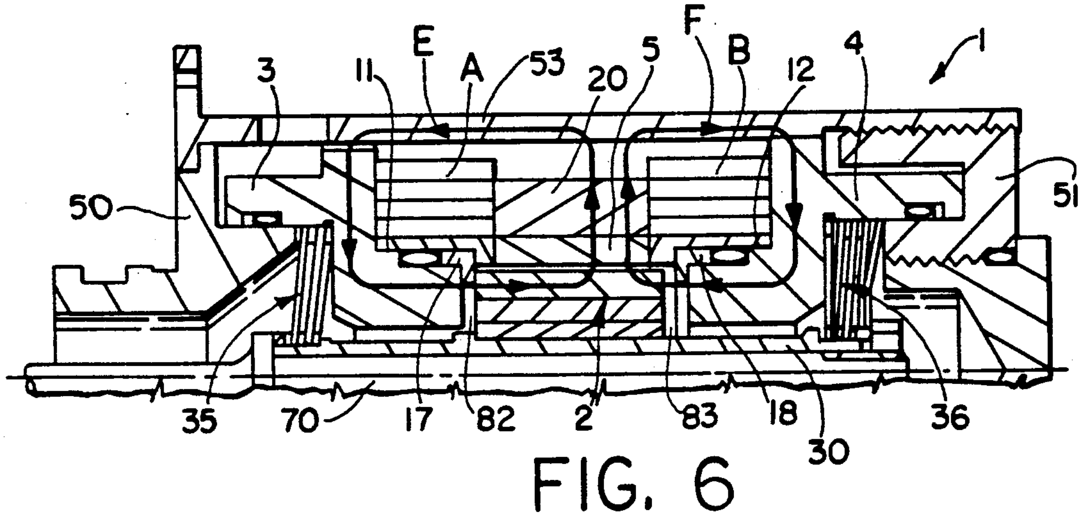
FIG. 6 is a fragmentary longitudinal section through the motor of FIG. 1, showing the coil current reversed as in FIG. 5, but with the armature shifted to the left.

The force produced by such combined electric and magnetic fields flux tending to move the armature 2 in one direction or the other may be maximized by making the housing 53, poles 3, 4 and armature 2 out of a suitable magnetic material such as magnetic iron which is capable of high flux levels, and matching magnetic volume and coil produced flux to approach saturation at one end and near zero flux levels at the other end of the armature 2 at rated current and deflection as schematically shown in FIGS. 4 and 6. The electrical flux lines can be considered to run around the outer circuit with the magnet 20 being seen as a large air gap. With the armature 2 shifted in one direction or the other by rated current (for example to the right as shown in FIG. 5), maximum return force may be obtained by reversing the coil current to assist the mechanical springs 35, 36 for chip shearing as schematically shown in FIG. 5. In FIG. 5 as well as in FIGS. 4 and 6, the flux arrows E, F show the combined electric and magnetic fields.

When a positive or negative current is applied to the motor coils A, B, the positive armature stops 17, 18 will prevent armature overtravel in either direction. Preferably, the armature stops 17, 18 have generally cylindrical portions 80 which are received in the clearance spaces between the spacer 5 and cylindrical inner end portions 11, 12 of the poles 3, 4 and radial flange portions 81 which extend radially inwardly into the magnetic air gaps 82, 83 between the poles 3, 4 and armature 2 for best control of the armature stroke (see FIGS. 3–7). To retain the armature stops 17, 18 in place, the sealing sleeve 5 may have a pair of axially spaced internal shoulders 84, 85 overlying a portion of the stop flanges 81.

Figure 7:
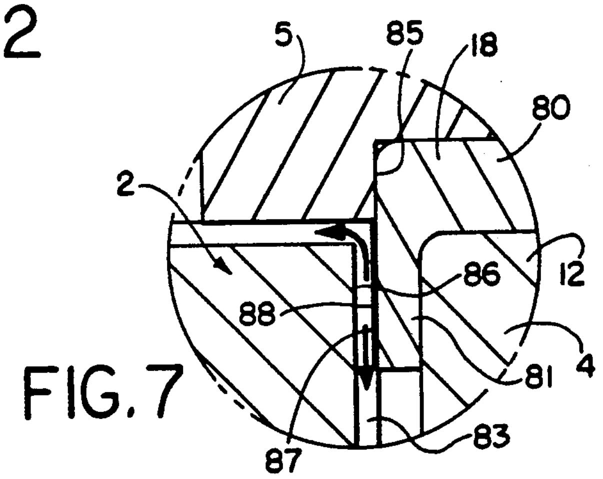
FIG. 7 is an enlarged fragmentary longitudinal section through the armature stop and surrounding motor parts at the right end of the motor armature of FIG. 1.

Locating the armature stops 17, 18 in the magnetic air gaps 82, 83 also provides the secondary function of producing orifice damping action as the armature 2 nears the stroke limits by causing fluid in the armature stop face regions to either reverse direction and flow through the annular area formed by the clearance between the armature 2 and sealing sleeve 5 or be forced through the annular area formed by the clearance spaces between the armature end faces 86 and armature stop faces 87 to reduce the impact between the armature end faces 86 and stop faces 87 (see FIG. 7). In addition, the armature stop faces 87 may be coated with a resilient polymer 88 as schematically shown in FIG. 7 to provide further cushioning if desired.

Furthermore, a controlled amount of eddy current damping may be obtained to provide resistance to resonating due to outside excitation by making the armature stops 17, 18 and the outboard portions 8, 9 of the sealing sleeve 5 out of a material having high electrical conductivity such as beryllium copper. This causes eddy currents to circulate in these components which absorb energy to provide the desired damping action which increases with stroke and frequency but is less sensitive to changes in temperature than the fluid damping methods previously described.

From the foregoing, it will now be apparent that the linear drive motor of the present invention is of a unique design which provides the frequency response characteristics, output power, linearity and symmetry to support the enhanced capabilities of a direct drive proportional servo valve or other such proportional device for execution of dynamic load damping, actuator stiffness enhancement and flutter suppression.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A linear drive motor comprising a pair of axially spaced relatively fixed stator poles, armature means mounted for axial movement between said stator poles, magnet means surrounding said armature means in radially spaced relation therefrom, coil means surrounding portions of said stator poles, and centering spring means for supporting said armature means for coaxial movement relative to said stator poles.

2. The motor of claim 1 wherein said armature means is mounted on an axially movable shaft for movement therewith, said centering spring means supporting said shaft for coaxial movement relative to said stator poles.

3. The motor of claim 2 wherein said armature means is supported intermediate opposite ends of said shaft, and said stator poles have axial openings through which said opposite ends of said shaft extend, said centering spring means supporting said opposite ends of said shaft for coaxial movement in said openings in said stator poles.

4. The motor of claim 3 wherein said centering spring means are substantially unloaded when said armature means is substantially centered with respect to said stator poles thereby reducing the possibility of inducing undesirable side loading.

5. The motor of claim 3 wherein said centering spring means flex equally in opposite directions.

6. The motor of claim 3 wherein each of said centering spring means includes a plurality of spring-like disks each having multiple flexure paths for redundancy against failure.

7. The motor of claim 6 wherein said spring-like disks for each of said centering spring means includes circumferentially spaced built-up regions around the outer periphery of said spring-like disks which are aligned and in contact with each other to assure proper deflection of said centering spring means along said flexure paths.

8. The motor of claim 7 wherein said spring-like disks for each of said centering spring means includes built-up hub portions for maintaining the desired spacing between adjacent disks at said hub portions.

9. The motor of claim 3 wherein said centering spring means are connected at their outer periphery to said stator poles and are connected at their inner periphery to said shaft.

10. The motor of claim 9 wherein said stator poles have axial outer ends containing counterbores in which said centering spring means are received, and end closures in said counterbores for clamping the outer periphery of said centering spring means to said stator poles.

11. The motor of claim 1 further comprising positive stop means between said armature means and said stator poles for preventing armature overtravel.

12. The motor of claim 1 wherein magnetic air gap means are provided between said stator poles and said armature means, and stop means extend into said magnetic air gap means for controlling the stroke of said armature means.

13. The motor of claim 12 wherein said stator poles include cylindrical inner end portions which support said stop means.

14. The motor of claim 13 wherein said stop means include generally cylindrical portions surrounding said cylindrical inner end portions of said stator poles and radial flange portions extending radially inwardly from said cylindrical portions into said magnetic air gap means.

15. The motor of claim 14 wherein said stop means are retained on said stator poles by sleeve means extending coaxially between said stator poles.

16. The motor of claim 15 wherein said sleeve means includes internal shoulders overlying a portion of said radial flange portions of said stop means for retaining said stop means on said stator poles.

17. The motor of claim 15 wherein said sleeve means includes outboard portions surrounding said cylindrical inner end portions of said stator poles.

18. The motor of claim 17 further comprising seal means between said outboard portions of said sleeve means and said cylindrical inner end portions of said stator poles.

19. The motor of claim 18 wherein there is a clearance space between said outboard portions of said sleeve means and said cylindrical inner end portions of said stator poles for receipt of said generally cylindrical portions of said stop means axially inwardly of said seal means.

20. The motor of claim 17 wherein said outboard portions of said sleeve means and said stop means are made of a material having a relatively high electrical conductivity which causes eddy currents to circulate therein thereby providing resistance to resonating due to outside excitation.

21. The motor of claim 20 wherein said outboard portions of said sleeve means and said stop means are made of beryllium copper.

22. The motor of claim 1 wherein magnetic air gap means are provided between said armature means and each of said stator poles, and stop means are located in each of said air gap means for controlling the stroke of said armature means, said stop means including means for producing damping action as said stator means nears the end of its stroke.

23. The motor of claim 22 further comprising resilient coating means on said stop means to cushion the movements of said armature means at the end of its stroke.

24. The motor of claim 1 wherein said magnet means comprises a ring magnet that is radially polarized.

25. The motor of claim 24 further comprising sleeve means extending between radial flange portions on said stator poles, said sleeve means extending coaxially over reduced diameter cylindrical inner end portions of said stator poles, said magnet means being supported by said sleeve means.

26. The motor of claim 25 wherein said coil means are also supported by said sleeve means adjacent opposite ends of said magnet means.

27. The motor of claim 1 wherein coil means are located adjacent each end of said magnet means, each of said coil means including a plurality of layers of coils, said layers of coils adjacent one end of said magnet means being paired with different layers of coils at the other end of said magnet means to provide redundant electrical channels which produce symmetric motion behavior.

28. The motor of claim 1 further comprising a motor shaft mounted for axial movement relative to said stator poles, said armature means being mounted on said motor shaft for axial movement therewith.

29. The motor of claim 28 wherein said motor shaft is hollow for receipt of a valve quill.

30. The motor of claim 29 wherein said valve quill includes a shoulder in abutting engagement with one end of said motor shaft and a fastener in abutting engagement with the other end of said motor shaft for securing said valve quill to said motor shaft.

31. The motor of claim 30 wherein separate centering spring means support each end of said motor shaft for axial movement relative to said stator poles.

32. The motor of claim 31 wherein each of said centering spring means includes spring-like disk means having multiple flexure paths, said disk means being connected at their outer periphery to said stator poles and being connected at their inner periphery to said motor shaft.

33. The motor of claim 32 further comprising loading spring means for maintaining uniform edge clamping of said spring centering means.

34. The motor of claim 32 further comprising end members for clamping the outer periphery of said disk means to said stator poles.

35. The motor of claim 34 further comprising loading spring means interposed between the end member and disk means at one end of said motor shaft for maintaining uniform edge clamping of said centering spring means.

36. The motor of claim 35 further comprising a motor housing surrounding said motor, said motor housing having a threaded connection with the end member at one end of said motor shaft, and radial inturned flange means on said motor housing overlapping the end member at the other end of said motor shaft.

37. The motor of claim 1 further comprising a housing surrounding said motor, said housing, stator poles, and armature means being made of a magnetic material capable of high flux levels and matching magnetic volume and coil produced flux to approach saturation at one end of said armature means and near zero flux levels at the other end of said armature means at rated current and deflection.

38. The motor of claim 1 wherein said armature means is mounted on a motor shaft intermediate the ends of said motor shaft, said stator poles have axial openings through which the ends of said motor shaft extend, and end members secured to axial outer ends of said stator poles, one of said end members having a central opening to provide for connection of said motor shaft to a flow control valve, the interior of said motor being exposed to fluid pressures in the valve through said central opening.

39. The motor of claim 38 further comprising sleeve means surrounding said armature means, said sleeve means extending coaxially between said stator poles, first seal means between said stator poles and said sleeve means and second seal means between said end members and said stator poles, said second seal means having a greater diameter than said first seal means, whereby the fluid pressures in the valve acting on the interior of said motor will maintain a compressive load on said stator poles while minimizing pressure loading and null shift due to changes in pressure.

40. The motor of claim 39 further comprising a motor housing surrounding said motor having a radially inwardly extending flange portion in overlapping engagement with said one end member and having a threaded connection with the other end member.

41. A linear drive motor comprising a pair of axially spaced relatively fixed stator poles, armature means mounted on a motor shaft for axial movement between said stator poles, magnet means surrounding said armature means in radially spaced relation therefrom, coil means surrounding portions of said stator poles, magnetic air gap means between said armature means and each of said stator poles, and stop means extending into said magnetic air gap means for controlling the stroke of said armature means, said stop means including means for producing damping action as said armature means nears the end of its stroke.

42. The motor of claim 41 further comprising resilient coating means on said stop means to cushion the movement of said armature means at the end of its stroke.

43. A linear drive motor comprising a pair of axially spaced relatively fixed stator poles, armature means mounted on a motor shaft for axial movement between said stator poles, magnet means surrounding said armature means in radially spaced relation therefrom, coil means surrounding portions of said stator poles, magnetic air gap means between said armature means and each of said stator poles, and stop means extending into said magnetic air gap means for controlling the stroke of said armature means, said stop means including generally cylindrical portions surrounding cylindrical axial inner end portions of said stator poles and radial flange portions extending radially inwardly from said cylindrical portions into said magnetic air gap means.

44. The motor of claim 43 wherein said stop means are retained on said stator poles by sleeve means extending coaxially between said stator poles.

45. The motor of claim 42 wherein said sleeve means include internal shoulders overlying a portion of said radial flange portions of said stop means for retaining said stop means on said stator poles.

46. The motor of claim 42 wherein said sleeve means include outboard portions surrounding said cylindrical inner end portion of said stator poles, said outboard portions of said sleeve means and said stop means being made of a material having relatively high electrical conductivity which causes eddy currents to circulate therein thereby providing resistance to resonating due to outside excitation.

47. The motor of claim 44 wherein said outboard portions of said sleeve means and said stop means are made of beryllium copper.

48. A linear drive motor comprising a pair of axially spaced relatively fixed stator poles, armature means mounted on a motor shaft for axial movement between said stator poles, magnet means surrounding said armature means in radially spaced relation therefrom, coil means surrounding portions of said stator poles, magnetic air gap means between said armature means and each of said stator poles, and stop means extending into said magnetic air gap means for controlling the stroke of said armature means, said coil means being located adjacent opposite ends of said magnet means, each of said coil means including a plurality of layers of coils, said layers of coils adjacent one end of said magnet means being paired with different layers of coils at the other end of said magnet means to provide redundant electrical channels and symmetric motion behavior.

49. A linear drive motor comprising a pair of axially spaced relatively fixed stator poles, armature means mounted on a motor shaft for axial movement between said stator poles, magnet means surrounding said armature means in radially spaced relation therefrom, coil means surrounding portions of said stator poles, said stator poles having axial openings through which the ends of said motor shaft extend, end members secured to axial outer ends of said stator poles, one of said end members having a central opening to provide for connection of said motor shaft to a flow control valve, the interior of said motor being exposed to fluid pressures in such valve through said central opening, sleeve means surrounding said armature means, said sleeve means extending coaxially between said stator poles, first seal means between said stator poles and sleeve means, and second seal means between said end members and said stator poles, said second seal means having a greater diameter than said first seal means, whereby the valve pressure acting interiorly of said motor will maintain a compressive load on said stator poles while minimizing pressure loading and null shift due to changes in pressure.

50. The motor of claim 49 further comprising a motor housing surrounding said motor, said motor housing having a radially inwardly extending flange portion in overlapping engagement with said one end member, and having a threaded connection with the other end member.

* * * * *